United States Patent [19]
Corbett nee Rolison

[11] 4,165,391
[45] Aug. 21, 1979

[54] AGENT FOR PROVIDING MEATY FLAVOR IN FOODS

[75] Inventor: Constance R. Corbett nee Rolison, White Plains, N.Y.

[73] Assignee: Stauffer Chemical Company, Westport, Conn.

[21] Appl. No.: 791,342

[22] Filed: Apr. 29, 1977

Related U.S. Application Data

[63] Continuation-in-part of Ser. No. 694,116, Jun. 8, 1976, abandoned.

[51] Int. Cl.² ............................................. A23L 1/226
[52] U.S. Cl. ................................... 426/580; 426/583; 426/589; 426/582; 426/650; 426/656
[58] Field of Search ................ 426/60, 650, 652, 655, 426/656, 583, 580, 582, 589

[56] References Cited
U.S. PATENT DOCUMENTS

| | | | |
|---|---|---|---|
| 2,928,740 | 3/1960 | Rosenthal et al. | 426/60 X |
| 2,999,753 | 9/1961 | Witwicka et al. | 426/60 |
| 3,573,271 | 3/1971 | Nielsen | 426/656 X |
| 3,711,301 | 1/1973 | Asogawa et al. | 426/650 X |
| 3,930,056 | 12/1975 | Feminella et al. | 426/650 X |

*Primary Examiner*—Raymond N. Jones
*Assistant Examiner*—Esther M. Kepplinger
*Attorney, Agent, or Firm*—Paul J. Juettner

[57] ABSTRACT

The present invention relates to an improved flavor agent for providing meaty flavor and increased flavor intensity to foods such as gravies, sauces, soups, cheese spreads, dairy based snack spreads or dip and seasoning mixes. The product comprises 50–85% hydrolyzed vegetable protein, 10–25% yeast autolysate and 5–25% on a dry solids basis of soluble modified whey solids selected from the group of delactosed whey solids, the second fraction obtained by passing a liquid mixture of cheese whey slides through a bed of molecular sieve resin, and the permeate and the delactosed permeate resulting from the ultrafiltration of whey, all percents being by weight.

18 Claims, No Drawings

AGENT FOR PROVIDING MEATY FLAVOR IN FOODS

This application is a continuation-in-part of Ser. No. 694,116 filed June 8, 1976 and now abandoned.

BACKGROUND OF THE PRESENT INVENTION

The present invention relates to an improved flavor agent for providing a meaty flavor and flavor intensity to foods such as soups, gravies, snack goods and seasoning mixes.

Flavoring agents for providing meaty flavor and flavor intensity to foods are well-known. Various imitation meaty flavors are added to such products as gravy mixes which can be used to form the gravy itself or in combination with meat drippings for enhanced meaty flavor, as well as dried soups, sauces and chip dips. These products normally contain a hydrolyzed vegetable protein (HVP—as used hereinafter meaning hydrolyzed vegetable protein) or a yeast autolysate or a yeast hydrolysate to impart a certain degree of beef flavor and flavor intensity. One of the better flavoring agents contains a blend of HVP and a yeast hydrolysate. However, the degree of quality of the flavoring agent is directly related to the quality of the HVP used in the flavoring agent. High quality HVP can be obtained by limitations in the processing techniques. This limited processing adds to the cost of the final HVP. It would be desirable to find a means of using a lower grade HVP while overcoming the flavor problems or sharpness, harshness, and rough flavor generally characteristic of this type of product.

It is also known to utilize yeast autolysate as a flavor donor and flavor enhancer. However, due to the cost of yeast autolysate, the use of yeast autolysate as sole flavor enhancer or donor is uneconomical.

It has also been taught in U.S. Pat. No. 3,930,056 to Feminella, et al., that the dried second fraction obtained by passing a liquid mixture of cheese whey solids through a bed of molecular sieve resin has flavor enhancing characteristics. This material is suggested for use in gravies, meat extracts, sauces, soups and the like. However, it has been found necessary to utilize in some soups and gravies, beef extract in a blend of the dried second fraction and HVP to provide the necessary flavor. Beef extract is again a very expensive material whose cost is reflected in the cost of the final product.

BRIEF SUMMARY OF THE INVENTION

It has been found that the foregoing problems can be overcome by the utilization of a flavoring agent comprising hydrolyzed vegetable protein, and yeast autolysate in combination with soluble modified whey solids selected from the group of delactosed whey solids, the dried second fraction obtained by passing a liquid mixture of cheese whey solids through a bed of molecular sieve resin, and the permeate and the delactosed permeate resulting from the ultrafiltration of whey. The delactosed whey solids are preferably clarified delactosed whey solids. A significant feature of the present invention is that lower grade HVP can be used in place of a higher grade HVP without sacrificing any flavor characteristics in the final product. The invention does not require the use of beef extract for flavor as required in some prior art product. The product of the present invention is lower in cost than the prior art product yet providing equivalent results.

DETAILED DESCRIPTION OF THE INVENTION

In accordance with the present invention, there is provided an improved flavoring agent having a meaty taste comprising from about 50% to about 85% by weight hydrolyzed vegetable protein, from about 10% to about 25% yeast autolysate and from about 5% to about 25% by weight on a dry solids basis of soluble modified whey solids selected from the group of delactosed whey solids, the second fraction obtained by passing a liquid mixture of cheese whey solids through a bed of molecular sieve resin, and the permeate and the delactosed permeate resulting from the ultrafiltration of whey all percents being by weight.

Hydrolyzed vegetable protein is an old and well-known product of commerce. It is the product of the chemical breakdown of a plant protein into various amino acids. Industrially, three basic methods of hydrolysis are available, enzymic, alkaline, and acidic. The most important commercial method from the foods standpoint is the acid hydrolysis method. The hydrolyzed vegetable protein is prepared by contacting a plant protein source with an acid, sulfuric or hydrochloric acid being generally used. After hydrolysis, the charge is neutralized with a base such as sodium hydroxide or sodium carbonate. The product is filtered and the filtrate is then bleached and debittered. The debittered filtrate is then subjected to a further filtration. The second filtrate can be evaporated to form a paste or spray dried to form a powder. The second filtrate can also be used directly if desired. The HVP can be used in any form though it is preferred to utilize the paste form when preparing a paste flavoring agent and the powder form when preparing a powdered flavoring agent.

Any plant source having available protein can be utilized in making hydrolyzed vegetable protein. As used herein, the term "hydrolyzed vegetable protein" is used in its accepted meaning to cover hydrolyzed plant protein. These plant sources include corn, wheat, cereal grain of any type, soy bean wheat gluten, maize gluten, oil seed meal such as corn, soy, cotton seed or peanut and the like. The preferred source of the hydrolyzed vegetable protein for use in the present invention is corn or blends of corn and wheat.

The type of products prepared during the hydrolysis of the protein are extremely varied in color and flavor depending upon the reaction sequence used and the raw materials used in the preparation. Basically, hydrolyzed vegetable proteins come in two basic types, i.e., flavor donor hydrolysates and flavor enhancer hydrolysates. Flavor donor hydrolysates are dark, strong, and meaty types which contribute a flavor of their own and widen the flavor spectrum of the food product. Flavor enhancer hydrolysates are products which enhance the natural flavor of the food but contribute little or no flavor of their own. In general, processing conditions will dictate whether a refined, delicate flavor or a stronger, darker flavor is obtained. This is all set forth in a paper by K. Prendergast, entitled "Protein Hydrolysate—A Review," which appeared in Food Trade Review, January 1974, pgs. 14 and 16–21.

The preferred hydrolyzed vegetable protein is used in an amount ranging from about 50% to about 85% by weight of the flavoring agent and preferably from about 71% to about 83%. Most preferable, the hydrolyzed vegetable protein is used in an amount within the range of from about 74% to about 81% by weight of the flavoring agent.

The yeast autolysate used in the present invention is the yeast extract product from standard yeast cells by an internal or self-hydrolysis caused by the action of proteolytic enzymes occurring naturally within the yeast. The yeast autolysate can be made from many yeast strains including *Torula utilis* though it is preferred to utilize the primary yeast *Saccharomyces cerevisiae* as the source of the yeast autolysate. The autolysate is generally formed by allowing the yeast to ferment on beet molasses for 24 hours to obtain the primary yeast at 17% total solids. Autolysis is allowed to occur at a pH from about 5–5.8 at a temperature of 37°–60° C. for 18 hours. Broken down cell walls are then separated and the extract concentrated under vaccum to 40% total solids. The concentrate is then filtered to remove insoluble amino acids. The filtrate is concentrated to 65% total solids and sterilized. The product can be sold as a liquid autolysate or concentrated to 80% total solids to form a paste autolysate. Yeast autolysate products are available in various form such as liquid, paste or powder mentioned hereinbefore and in varying total solids content, salt (NaCl) content and protein content. Premium grade yeast autolysates generally have a higher protein content and a lower salt content for equivalent total solids.

The yeast autolysate is generally used in an amount ranging from about 10% to about 25% by weight and preferably from about 12% to about 14% by weight. The yeast autolysate can be used in any form though it is preferred to utilize the paste form when forming a paste flavoring agent and the powdered form when forming a powdered flavoring agent.

The soluble modified whey solids identified as the dried second fraction which is used in the present invention are obtained as the second fraction produced by passing a liquid mixture of cheese whey solids through a bed of molecular sieve resin as described in U.S. Pat. No. 3,548,900, now U.S. Pat. No. Re. 27,806. The second fraction can be described as soluble modified whey solids. Basically, the process involves passing cheese whey through a molecular sieve resin to fractionate the whey. The first fraction from the bed consists mainly of protein with residual lactose and ash. The second fraction, consisting mainly of lactose and ash with residual protein, has the following general composition:

| | |
|---|---|
| Lactose, % | 40–50 |
| Minerals, % | 20–35 |
| Protein, (N × 6.38), | 15–20 |
| Lactic Acid, % | 7–10 |
| Citric Acid, % | 3–6 |
| Fat, % | less than 1 |
| Moisture, % | less than 5 |
| pH | 6.6–7.2 |

The major constituents of the mineral or ash component are sodium—6.5%; potassium—6.6%; calcium—0.3%; phosphorus 1.2% and magnesium—0.14%.

Fractionation may be determined by measuring the conductivity of the eluate from the bed. Typically, the conductivity range for the second fraction containing the modified whey solids used in the present invention is between about 5,000 micromhos to about 15,000 micromhos, as is shown in FIG. 7 of U.S. Pat. No. Re. 27,806.

In the preferred form of the invention, the liquid whey which is fractionated by the gel bed is a clarified delactosed cheese whey. The whey is clarified by adjusting the pH of acid whey or blends of acid and sweet whey containing at least 20% acid whey to a neutral pH within the range of from about 6–8 and preferably from about 6.5–7.5 and most preferably from about 7 to about 7.2 or adjusting the calcium content of sweet whey or whey blends as disclosed in U.S. Pat. No. 3,560,219 to facilitate removal of cheese fines, and denatured proteins by the formation of an insoluble phospho-lipid complex. The whey is centrifuged to remove suspended matter such as the cheese fines, denatured proteins and the phospho-lipid complex. These materials tend to plug the gel bed and reduce the through-put rate. Following clarification, the clarified whey is concentrated by vacuum and heat evaporation to 60–62% solids. Conventional crystallization of lactose ensues by subjecting the concentrated clarified whey to agitation and cooling. The mother liquor obtained after separation of the crystallized lactose is termed clarified delactosed whey. This is the preferred material for use in fractionating whey by gel filtration. This material can also be dried and used as such. The dried product is termed clarified delactosed whey solids. Whey products are pasteurized and concentrated by U.S. Department of Agriculture approved procedures generally after fractionation. Products of this type are generally available from Stauffer Chemical Company, Westport, Conn., under the trademark ENR-EX ®. Delactosed whey solids prepared without the clarification step can be used if desired. The term delactosed whey solids is intended to include delactosed whey solids and clarified delactosed whey solids.

Also usable in the present invention is the permeate obtained from the ultrafiltration of whey. A representative method for ultrafiltration is disclosed in Horton, B. S., et al., Food Technology, Vol. 26, p. 30, 1972. In a typical process, cottage cheese whey is neutralized to a pH 6.4 with 50% caustic. After storage, the pH is then adjusted to 7.2 and any solids or precipitates are removed by centrifugal clarifiers. The clarified liquor is then pasteurized. The liquor is then fed into an ultrafiltration membrane unit. The permeate is condensed and spray dried. The permeate can be delactosed at this stage by normal lactose crystallization techniques. If a membrane having a 20,000 molecular weight cut off is used, the permeate generally comprises from about 4% to about 6% protein (N×6.38), from about 80% to about 83% lactose, from about 10% to about 12% ash and about 0% fat. The delactosed permeate generally comprises from about 9% to about 11% protein, from about 42% to about 45% lactose, from about 30% to about 35% ash and about 0% fat. If a membrane having a higher molecular weight cut off is used, the protein content will generally increase and the lactose content will generally decrease, conversely, a membrane having a lower molecular weight cut off will generally show a decrease in protein and an increase in lactose in the product.

The ultrafiltration of whey can be accomplished by using whey, concentrated whey, delactosed whey, delactosed clarified whey and the like. As used herein, the term ultrafiltration of whey is intended to cover the ultrafiltration of whey, condensed whey, delactosed whey and delactosed clarified whey.

The second fraction can be used as a paste or a powder in either paste or powder formulations. If, however, the powdered form of the second fraction is used in a paste formulation, it is suggested that the powder be given a short time (about 12 hours) to dissolve in the liquid of the paste prior to use. This normally is not a problem since time is required to ship the product to a user. To avoid any problems, it is suggested that the second fraction be admixed with water to form a paste prior to blending. An effective paste has been formed by blending 80 grams of the second fraction and 20 grams of water in a high speed high shear blender. These amounts can be varied depending on the fluidity of the paste desired.

The flavoring agents of the present invention can be prepared as liquids, pastes or dry solids as desired. End use may dictate form. Special blending techniques are not required except the normal sanitary conditions used in preparing foods. Other flavorings such as meat extract can be added if desired. Fillers, dyes, pigments and other ingredients such as ribonucleotides, monosodium glutamate, spices, and the like can also be added if desired.

The flavoring agents of the invention can be used in enhancing the flavor of food products. The foods contemplated to be benefited by the present invention include meats, comminuted meats, vegetable protein extended ground meat, sausage, meat patties, meat loaves, luncheon meats, gravies, both of a meat base such as gravy and imitations thereof using hydrolyzed vegetable proteins and meat extracts, sauces, soups, including bouillion, stews, casseroles, hash, pate, meal coatings, batters and breading for meat such as fried chicken, dressings, stuffings, vegetables and sauces therefor such as frozen pouch type vegetables with sauces, fish sauce, teriyaki sauce, soy sauce, Chinese vegetables, salted fish and meat, dietetic foods, salad dressings, salad flavorings such as imitation meat flavored croutons or bits, and animal foods such as dog and cat food including dried, semimoist and moist, and cheese products such as spray dried cheese, processed cheese foods, chips, coatings for corn or potato chips, spreads, and cheese used to enhance flavor in snack foods. In essence, the products of the invention can be utilized in substantially all areas where other well known flavoring agents present find utility to provide meaty and savory flavor.

The present invention will be more fully illustrated in the examples which follow.

EXAMPLE 1

Three flavoring agent paste blends were prepared in accordance with the present invention by blending the following ingredients with a fork in a small bowl:

|  | Example (Percent by weight) | | |
| --- | --- | --- | --- |
|  | 1-A | 1-B | 1-C |
| HVP Paste[1] | 75 | 80.03 | 77.41 |
| Yeast Autolysate[2] Paste | 12.5 | 13.34 | 12.90 |
| Second Fraction Powder[3] | 12.5 | 6.63 | 9.69 |

[1]Corn based hydrolysate, Vi-zate 268, A. E., Staley Manufacturing Co., Chicago Ill.
[2]NIV brand yeast autolysate available from Stauffer Chemical Company, Westport, Conn.
[3]Available as ENR-EX, ibid No. 2.

The three blends were evaluated organoleptically in two different commercial brown gravy formulations against a control of one of the better products of industry. The formulations utilized are as follows:

|  | Parts by Weight | |
| --- | --- | --- |
| Brown Gravy Formulation 1 | Control | Invention |
| HVP[4] | 4.50 | 4.50 |
| Flavoring Agent Examples 1-A, 1-B, or 1-C | — | 10.32 |
| Flavoring agent (Control)[5] | 10.32 | — |
| Wheat Flour | 25.50 | 25.50 |
| Waxy Maize Starch | 23.00 | 23.00 |
| Salt, Granulated | 5.50 | 5.50 |
| Sugar, Granulated | 4.50 | 4.50 |
| Monosodium Glutamate | 4.25 | 4.25 |
| Onion Powder, Toasted | 4.50 | 4.50 |
| Malto Dextrin | 10.90 | 10.90 |
| Caramel Color Powder (Beef Red) | 1.65 | 1.65 |
| White Pepper, Ground | .20 | .20 |
| Hydrogenated Vegetable Oil | 6.40 | 6.40 |

[4]Maggi HPP Type RF-B Powder with partially hydrogenated vegetable oil-The Nestle Company, Inc., White Plains, NY
[5]Maggi HPP Type 4BE Paste with partially hydrogenated vegetable oil added-The Nestle Company, Inc., White Plains, NY The brown gravy was prepared by combining 28 grams of the formulation with 236.6 milliliters of water, heating until boiling and simmering for two minutes.

|  | Parts by Weight | |
| --- | --- | --- |
| Brown Gravy Formulation No. 2 | Control | Invention |
| HVP[6] | 8.80 | 8.80 |
| Flavoring Agent, Examples 1-A, 1-B, and 1-C | — | 14.48 |
| Flavoring Agent (Control)[5] | 14.48 | — |
| Malto Dextrin | 16.00 | 16.00 |
| Salt, Granulated | 6.00 | 6.00 |
| Caramel Color Powder | 1.00 | 1.00 |
| Pepper, White | 0.10 | 0.10 |
| Beet root powder | 0.30 | 0.30 |
| Non-fat milk solids, agglomerated | 7.00 | 7.00 |
| corn starch | 45.50 | 45.50 |
| Onion Powder, Toasted | 2.30 | 2.30 |

[6]Maggi HPP Type 245 Powder with partially hydrogenated vegetable oil added-The Nestle Company, Inc., White Plains, NY The brown gravy was prepared by combining 22 grams of the formulation with 236.6 milliliters of water, heating to a boil while stirring constantly and simmering for one minute under reduced heat.

These compositions were tested by a small informal taste test panel by tasting just the heated gravy itself. Five out of five panelists preferred the gravies made using the flavoring agent of Example 1A over the control. More enhanced flavor was noticed by four of the panelists. Gravies made using the flavoring agents of Examples 1-B and 1-C were judged to have slight flavor difference when compared to the control. The gravy prepared using the flavoring agent of Example 1-C was closest to the control in intensity and type of flavor. Even though the quality of HVP used in preparing the flavoring agent of the present invention was significantly lower than that used in the control as evidenced by its harsh flavor, generally dark color and low cost, equivalent results were obtained.

EXAMPLE 2

Flavoring agent blends were prepared by blending the following ingredients:

|  | Example (Percent by weight) | | |
| --- | --- | --- | --- |
|  | 2A | 2B | 20 |
| HVP - Powder[7] | 75% | — | — |

| -continued | | | |
|---|---|---|---|
| HVP - Powder[8] | — | 75% | — |
| HVP - Paste[9] | — | — | 75% |
| Yeast Autolysate | 12.5[10] | 12.5[10] | 12.5[2] |
| Second Fraction[3] | 12.5 | 12.5 | 12.5 (Paste) |

[7]Campbell's HPP-3R powder  ⎫ Technological Resources, Inc.
[8]Campbell's HPP-2S powder  ⎬ Subsidiary of Campbell Soup Co.
                                P.O. Box 391
                                Camden, New Jersey 08101
[9]Beef Corral Paste, Pfizer
[10]NAT 38 Yeast Autolysate Powder Available from Stauffer Chemical Company, Westport, Conn.

These blends were tested in the two brown gravy formulations of Example 1. If monosodium glutamate (MSG) was present in the recipe (Formulation 1), it was found necessary to adjust the amount of MSG so that the final formulation has a taste intensity equivalent to the control though an effective product is gained without the adjustment. In formulation 2A, no adjustment is required. In formulation 2B, the MSG is increased by 5%. In formulation 2-C, the MSG level is increased 50%. These adjustments are carried through in all formulations containing MSG.

The following agents of Examples 2-B and 2-C were tested by 15 and 16 member taste panels in beef dip and chili seasoning mix of the following commercial formulations:

| Beef Dip | Parts by Weight | |
|---|---|---|
| | Control | Invention |
| HVP[11] | 45.00 | 45.00 |
| Flavoring Agent, Examples 2B, 2C | | See Table I |
| Flavoring Agent (Control)[5] | | See Table I |
| Monosodium Glutamate | | See Table I |
| Onion Powder, Fresh Flavor | 1.30 | 1.30 |
| Celery, Soluble | 2.20 | 2.20 |
| Garlic Powder | 1.00 | 1.00 |
| Sodium Silico Aliminate | 2.00 | 2.00 |

[11]Maggi HPP Type 4BE-2 Powder with partially hydrogenated vegetable oil added. The Nestle Company, Inc., White Plains, NY A beef dip is prepared by adding 45 grams of the above formulation to 473.2 milliliters of sour cream.

TABLE I

| | | Parts by Weight | |
|---|---|---|---|
| | | Control | Invention |
| 2-B-1 | Flavoring Agent - Example 2-B | — | 45.00 |
| | Flavoring Agent Control[5] | 45.00 | — |
| | Monosodium Glutamate | 3.50 | 3.68 |
| 2-C-1 | Flavoring Agent example 2-C | — | 51.75 |
| | Flavoring Agent Control[5] | 51.75 | — |
| | Monosodium Glutamate | 3.50 | 5.25 |

| Chili Seasoning Mix | |
|---|---|
| Flavoring Agent, Examples 2-A, 2-B & 2-C | See Table II |
| Flavoring Agent, (Control)[5] | See Table II |
| Monosodium Glutamate | See Table II |
| Paprika, Microground | 5.00 |
| Chili Powder | 10.75 |
| Onions, Minced, Fresh Flavor | 17.00 |
| Wheat Flour, Dried | 42.00 |
| Salt, Granulated | 8.50 |
| Garlic Powder | 1.00 |
| Oregano, Ground | 1.50 |
| Cumin Seed, Ground | 2.50 |
| Citric Acid, Anhydrous | 0.50 |
| Cayenne Pepper | 0.25 |
| Sugar, Granulated | 4.00 |

The chili mix is prepared by browning 454 grams of ground beef until crumbly. After removing from the heat, 42.5 grams of the chili seasoning mix, 120 milliliters of water, 454 grams of red kidney or pinto beans and 230 milliters of tomato sauce were mixed thoroughly with the browned meat. The mixture is brought to a boil while stirring. The mixture is then simmered 10–15 minutes uncovered.

TABLE II

| | Parts by Weight | |
|---|---|---|
| | Control | Invention |
| 2-A-2 Flavoring Agent, Example 2-A | — | 7.00 |
| Flavoring Agent (Control)[5] - Powder | 7.00 | — |
| 2-B-2 Flavoring Agent, Example 2-B | — | 7.00 |
| Flavoring Agent (Control)[5] - Powder | 7.00 | — |
| Monosodium Glutamate | — | 0.05 |
| 2-C-2 Flavoring Agent, Example 2-C | — | 8.05 |
| Flavoring Agent (Control)[5] | 8.05 | — |
| Monosodium Glutamate | — | 0.50 |

The flavoring agent of Example 2-C was also formulated as part of a dehydrated beef noodle soup mix of the following formulation:

| Beef Noodle Soup Mix | Parts by Weight | |
|---|---|---|
| | Control | Invention |
| Flavoring Agent, Example 2-C | — | 12.00 |
| Flavoring Agent (Control)[5] Powder | 12.00 | — |
| HVP[12] | 11.00 | 11.00 |
| Beef Fat | 8.00 | 8.00 |
| Corn Starch, dried | 12.00 | 12.00 |
| Monosodium Glutamate | 10.00 | 10.00 |
| Salt | 24.00 | 24.00 |
| Spice Blend[13] | 2.00 | 2.00 |
| Turmeric | 0.10 | 0.10 |
| Caramel Color Powder | 0.50 | 0.50 |
| Sugar | 10.40 | 10.40 |
| Malto-Dextrin | 10.00 | 10.00 |

[12]Maggi Super BE Powder, The Nestles Company, Inc., White Plains, NY

| [13]Spice Blend | % |
|---|---|
| Celery Salt | 16.20 |
| Garlic Powder | 1.45 |
| White Pepper | 1.21 |
| Rosemary | 0.32 |
| Cloves | 0.08 |
| Cayenne Pepper | 0.16 |
| Onion, gran. | 80.58 |

The beef noodle soup was prepared by blending 28 grams of base and 30 grams of noddles per each 946.24 milliliters water. The mixture is heated to a boil and simmered partly covered for four minutes.

These formulations were evaluated by 15 and 16 member taste test panels. The following results were achieved (results based on a hedonic scale set forth in Table III which relates verbal descriptions to numerical scores).

| Beef Dip | 2-B | Control | 2-C | Control |
|---|---|---|---|---|
| Preference (panelists) | 7 | 4 | 11 | 3 |
| No Preference (panelists) | 5 | | 2 | |
| Flavor Acceptability | 3.4 | 2.8 | 4.8 | 3.6 |
| Flavor Similarity to Control | | 3.9 | | 3.9 |

| Chili Seasoning Mix | 2-A | Control | 2-B | Control | 2-C | Control |
|---|---|---|---|---|---|---|
| Preference (panelists) | 7 | 5 | 6 | 5 | 10 | 2 |
| No Preference (panelists) | 4 | | 5 | | 3 | |
| Flavor Acceptability | 5.3 | 5.4 | 5.4 | 5.4 | 6.0 | 5.0 |
| Flavor Similiarity to Control | | 4.6 | | 4.6 | | 4.6 |

| Beef Noodle Soup | 2-A | Control |
|---|---|---|
| Preference (panelsists) | 7 | 2 |
| No Preference (panelists) | 7 | |
| Flavor Acceptability | 5.2 | 4.8 |
| Flavor Similarity to Control | | 5.0 |

The hedonic scale used in these evaluations is set forth in the following Table:

TABLE III

FLAVOR ACCEPTABILITY

| Verbal Description | Numerical Score |
|---|---|
| Like Extremely | 7.0 |
| Like Very Much | 6.0 |
| Like | 5.0 |
| Neither Like nor Dislike | 4.0 |
| Dislike | 3.0 |
| Dislike very much | 2.0 |
| Dislike Extremely | 1.0 |

FLAVOR SIMILARITY

| Verbal Description | Numerical Score |
|---|---|
| Extremely Similar | 6.0 |
| Very similar | 5.0 |
| Similar | 4.0 |
| Slightly Dissimilar | 3.0 |
| Very dissimilar | 2.0 |
| Extremely dissimilar | 1.0 |

The present invention is defined in the claims which follow.

What is claimed is:

1. A food flavoring agent consisting essentially of from about 50% to about 85% by weight hydrolyzed vegetable protein, from about 10% to about 25% by weight yeast autolysate and from about 5% to about 25% by weight on a dry solids basis of soluble modified whey solids selected from the group consisting of delactosed whey solids, the second fraction obtained by passing a liquid mixture of cheese whey solids through a bed of molecular sieve resin, and the permeate and the delactosed permeate resulting from the ultrafiltration of whey, said second fraction having the following composition:

| | |
|---|---|
| Lactose, % | 40–50 |
| Minerals, % | 20–35 |
| Protein, (N × 6.38), | 15–20 |
| Lactic Acid, % | 7–10 |
| Citric Acid, % | 3–6 |
| Fat, % | less than 1 |
| Moisture, % | less than 5 |
| pH | 6.6–7.2, | and said permeate having the following composition:

| | |
|---|---|
| Lactose, % | 80–83 |
| Minerals, % | 10–12 |
| Protein, (N × 6.38), | 4–6, | said delactosed permeate having the following composition:

| | |
|---|---|
| Lactose, % | 42–45 |
| Minerals, % | 30–35 |
| Protein, (N × 6.38), | 9–11. |

2. The food flavoring agent as recited in claim 1 wherein said hydrolyzed vegetable protein is present in an amount of from about 71% to about 83% by weight, said yeast autolysate is present in an amount of from about 12% to about 14% by weight and said soluble modified whey solids are present in an amount of from about 5% to about 15% by weight on a dry solids basis.

3. The food flavoring agent as recited in claim 1 which is in the form of a paste.

4. The food flavoring agent as recited in claim 1 which is in the form of a powder.

5. The food flavoring agent as recited in claim 1 wherein said yeast autolysate is the autohydrolysis product of the primary yeast *Saccharomyces cerevisiae*.

6. The food flavoring agent as recited in claim 1 wherein said delactosed whey solids are clarified delactosed whey solids.

7. The food flavoring agent as recited in claim 1 wherein said liquid mixture of cheese whey solids is clarified delactosed cheese whey.

8. A method of providing a meaty flavor in a food consisting essentially of adding to said food in an effective amount to enhance the flavor of said food of a food flavoring agent consisting essentially of from about 50% to about 85% by weight hydrolyzed vegetable protein, from about 10% to about 25% by weight yeast autolysate and from about 5% to about 25% by weight on a dry solids basis of soluble modified whey solids selected from the group consisting of delactosed whey solids, the second fraction obtained by passing a liquid mixture of cheese whey solids through a bed of molecular sieve resin, and the permeate and the delactosed permeate resulting from the ultrafiltration of whey, said second fraction having the following composition:

| | |
|---|---|
| Lactose, % | 40–50 |
| Minerals, % | 20–35 |
| Protein, (N × 6.38), | 15–20 |
| Lactic Acid, % | 7–10 |
| Citric Acid, % | 3–6 |
| Fat, % | less than 1 |
| Moisture, % | less than 5 |
| pH | 6.6–7.2, | and said permeate having the following composition:

| | |
|---|---|
| Lactose, % | 80–83 |
| Minerals, % | 10–12 |
| Protein (N × 6.38), | 4–6, and | said delactosed permeate having the following composition:

| | |
|---|---|
| Lactose, % | 42–45 |
| Minerals, % | 30–35 |
| Protein, (N × 6.38), | 9–11. |

9. The method as recited in claim 8 wherein said food is selected from the group consisting of gravies, sauces, soups, cheese spread, dairy based snack spreads, dairy based snack dips and seasoning mixes.

10. The method as recited in claim 8 wherein said hydrolyzed vegetable protein is present in an amount of from about 71% to about 83% by weight, said yeast autolysate is present in an amount of from about 12% to about 14% and said modified whey solids are present in an amount of from about 5% to about 15% by weight on a dry solids basis.

11. The method as recited in claim 8 wherein said yeast autolysate is the autohydrolysis product of the primary yeast *Saccharomyces cerevisiae.*

12. The method as recited in claim 8 wherein said delactosed whey solids are clarified delactosed whey solids.

13. The method as recited in claim 8 wherein said liquid mixture of cheese whey solids is clarified delactosed cheese whey.

14. The method as recited in claim 8 wherein said second fraction is added as a dry material.

15. A food product having a meaty taste which includes an effective amount for flavor enhancing of the product of claim 1.

16. The product as recited in claim 15 wherein said food product is selected from the group consisting of gravies, sauces, cheese spreads, soups, dairy based snack spreads, dairy based snack dips and seasoning mixes.

17. A food flavoring agent consisting essentially of from about 71% to about 83% by weight hydrolyzed vegetable protein, from about 12 to about 14% by weight of the autohydrolysis product of the primary yeast Saccharomyces cerevisiae; and from about 5% to about 15% by weight on a dry solids basis of soluble modified whey solids selected from the group consisting of delactosed whey solids, permeate and delactosed permeate resulting from the ultrafiltration of whey, and the dried second fraction obtained by passing a liquid mixture of clarified delactosed whey solids through a bed of molecular sieve resin, said second fraction having the following composition:

| | |
|---|---|
| Lactose, % | 40–50 |
| Minerals, % | 20–35 |
| Protein, (N × 6.38), | 15–20 |
| Lactic Acid, % | 7–10 |
| Citric Acid, % | 3–6 |
| Fat, % | less than 1 |
| Moisture, % | less than 5 |
| pH | 6.6–7.2, | and said permeate having the following composition:

| | |
|---|---|
| Lactose, % | 80–83 |
| Minerals, % | 10–12 |
| Protein, (N × 6.38), | 4–6, | said delactosed permeate having the following composition:

| | |
|---|---|
| Lactose, % | 42–45 |
| Minerals, % | 30–35 |
| Protein, (N × 6.38), | 9–11. |

18. The method of providing a meaty flavor in a food which comprises adding to said food the product of claim 17 in an amount effective to provide a meaty flavor in said food.

* * * * *

UNITED STATES PATENT AND TRADEMARK OFFICE
CERTIFICATE OF CORRECTION

PATENT NO. : 4,165,391
DATED : August 21, 1979
INVENTOR(S) : Constance R. Corbett nee Rolison It is certified that error appears in the above—identified patent and that said Letters Patent is hereby corrected as shown below:

In the Abstract, line 4, "dip" should read -- dips --.
line 10, "slides" should read -- solids.

Column 1, line 27, after "agent" insert a period (.).

Column 3, line 16, "vaccum" should read -- vacuum --.
lines 64 and 65, "micromhos" should read -- microhms -.

Column 6, line 65, "20" should read -- 2C --.

Column 7, line 40, "Aliminate" should read -- Aluminate --.

Column 8, line 66, Noddles" should read -- noodles --.

Column 9, line 28, "panelsists" should read -- panelists --.

Column 12, Claim 17, line 12, "Saccharomyces cerevisiae" should be in italics.

Column 8, Footnote 12, line 56, "Nestles" should read -- Nestle --.

Signed and Sealed this

Eleventh Day of December 1979

[SEAL]

Attest:

SIDNEY A. DIAMOND

Attesting Officer    Commissioner of Patents and Trademarks